Feb. 8, 1938.  H. S. CRYSLER ET AL  2,107,471
SECTIONAL ROLL
Filed March 20, 1937
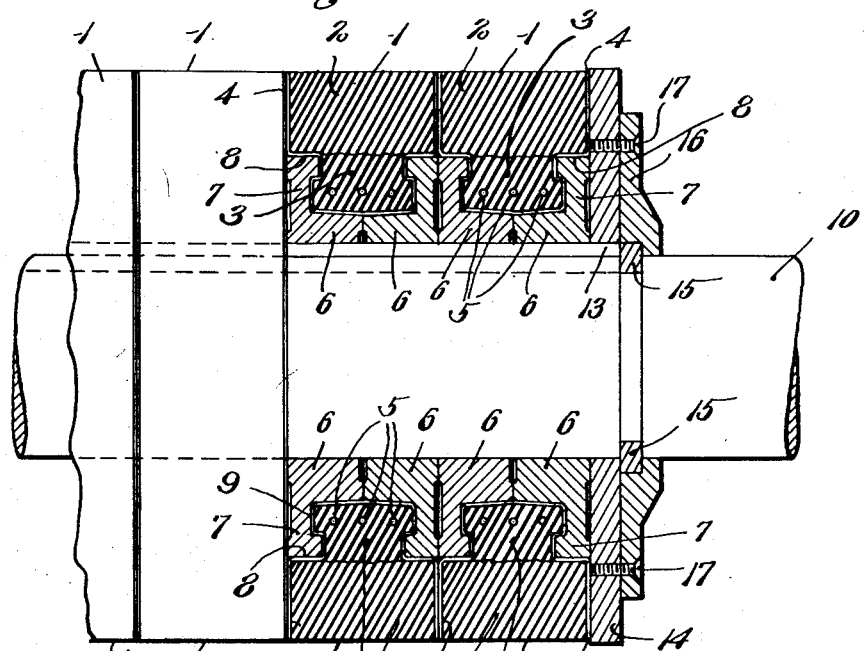
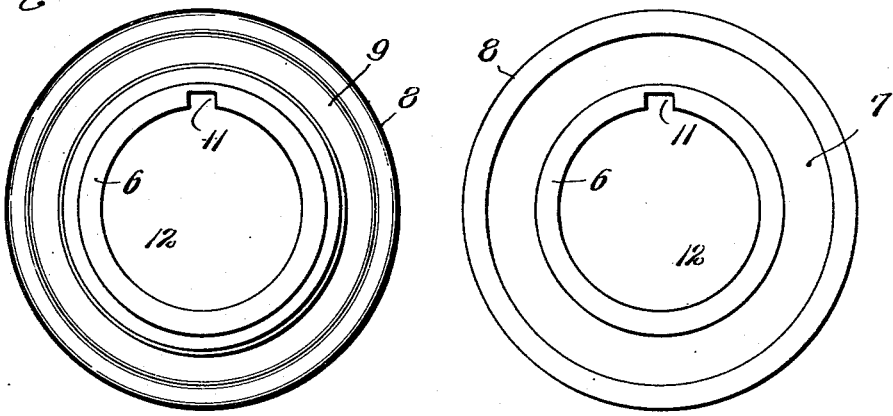
Inventors:
H. Stanley Crysler
Robert E. Willsie
by George A. Rockwell,
Atty.

Patented Feb. 8, 1938

2,107,471

UNITED STATES PATENT OFFICE 2,107,471

SECTIONAL ROLL

H. Stanley Crysler, Lowell, and Robert J. Wilkie, Newton, Mass.

Application March 20, 1937, Serial No. 132,074

1 Claim. (Cl. 68—277)

The principal objects of our invention are to improve sectional rolls of the general type disclosed in the patent to Crysler No. 1,569,536 dated January 12, 1926, our roll being useful for many purposes but especially useful for wringing machines.

A feature of our invention is a metallic ring having a flange whose periphery is spaced from the centre of the ring at such a relatively short distance that, for a given diameter of rubber section, there will be available a relatively large portion of the rubber extending radially beyond said periphery so that said extending portion may, in itself, be made softer than heretofore and also there will be more surface area provided to act as a cushion against the corresponding surface area of the adjacent rubber sections with a consequent better squeeze for certain classes of work and closer contact between adjacent rubber faces to prevent leakage of dirty liquors between the rubber sections, there being with our flange no tendency to separate one rubber section from the adjacent rubber section.

Another feature is the structure of said flange consisting in a substantially flat periphery for said flange to act as an inner support for a portion of the rubber section. The flange is preferably formed with a depression at the inside adjacent said periphery so that the flange acts with a hooking grip along the face of the inner or base portion of a rubber section to effectively hold the rubber section.

Other features of our invention will be pointed out below.

In the drawing:

Figure 1 is an elevation, partly in section, showing a portion of the complete assembled roll ready for use;

Figure 2 is an elevation of one side of one of the metallic members described below; and Figure 3 is an elevation of the opposite side of said metallic member.

Rubber sections, indicated generally at 1, 1, are of annular or ring-like form circularly recessed on their sides and are preferably made of rubber of two or more densities and compositions, for example, a relatively soft rubber in the peripheral portion 2, and a denser rubber in the base portion 3, the two kinds of rubber being integrally united or vulcanized into one unitary section. The sections 1 have as a part of their exterior or cover a suitable fabric 4, for example, canvas which may be vulcanized or bonded to the rubber, the fabric here being shown as extending to the peripheral or wringing surface of the sections though it may terminate at a point short of the said surface. It has been found that this fabric, among other advantages, enables the ring members to grip and hold the sections without the use of lugs by reason of the frictional engagement of the fabric on the section with the metal flange member. If, for any reason, a section should turn slightly, the fabric prevents the rubber from being injured or disintegrated during the turning and will cause the section to bind fast and operate as it should. The section construction here shown, without the radial recesses for lugs, has wires 5, embedded in and vulcanized into the bases. These wires 5 resist the radial, outward thrust upon the rubber section caused by the insertion within the rubber section of the longitudinally extending hub portions 6 of the metallic rings, described below, upon which the rubber sections are seated with a tight fit, and cooperate therewith to create a firm frictional engagement between the interior surfaces of the rubber sections and said hub portions 6 of the metal rings upon which they are seated. Thus the sections as the result of the application of the assembling pressure are firmly gripped at their bases as well as upon their side surfaces, by the metallic ring members.

Each rubber section 1 is formed at each side to engage the flat periphery of the flange, described below, and also to enter beneath the hook, described below, of said flange.

Each metallic member is formed with a hub 6 and a flange 7, the latter having a flat periphery 8 to act as an inner support for a portion of the rubber section and to avoid any tendency to force a face of one rubber section away from the face of the adjacent rubber section. Adjacent to the periphery the flange has a depression 9 at its inner face which provides a hook at the outer edge of the flange, beneath which hook a portion of the rubber extends so that we provide a substantial and practical gripping of the base, or harder portion of the rubber section.

The base, or harder portion of the rubber section, extends radially outwardly about as far as the periphery 8 which is about one-half the distance from the periphery of the central shaft 10 to the periphery of the rubber section, the outer portion of said rubber section being of soft rubber.

Two of the metallic members grip each rubber section 1 on opposite sides, with the back or reverse sides of the ring members in contact with each other when the assembling pressure is applied as shown in Figure 1.

The rubber sections are held by, and compressed between, adjacent flanges by pressure oppositely applied to and maintained against the respective ends of the group of rubber sections, the harder base portions being formed to withstand the major part of the compression.

The metallic ring members are provided with a key-way 11 and central opening 12 which are adapted to fit the shaft 10 and key 13 so that the ring members are positively turned by any rotation of the shaft.

The rubber sections and ring members upon being placed upon shaft 10 are subjected to heavy end pressure of several tons, for example 10 to 20 tons, and then locked in place at both ends by any suitable means. The device here shown to hold the sections and ring members in place may be used at either or both ends of the assembled group of sections and flanges and consists of an annular plate or end flange 14 which having been axially pressed to proper position is held in place by a split or two part locking ring 15 seated in an annular circumferential groove in the shaft 10. An annular plate 16 having a recessed portion to fit the locking ring holds the locking ring in place, the plate itself being held to the end flange 14 by screws 17. Each section is made of a suitable thickness so that it will be firmly gripped and held between two ring members when the latter are pressed together, the aggregate thickness of each pair of ring members being such that they nearly or barely touch each other underneath the section when the latter has been suitably compressed for service (see Figure 1). Thus in the event that one or more rubber sections should break away the remaining sections will still be held compressed and securely gripped thereby allowing the roll to be operated by filling in with lapping the space formerly occupied by the broken sections without injury to the remaining sections until such time as it is convenient to shut down the machine and remove the roll for the replacement of the section or sections which failed. It is important that the sections be under a heavy pressure to prevent turning or slipping and that the pressure be uniform and applied from the ends of the assembled group.

We use the word "rubber" to include equivalents such as various mixtures and compounds of rubber, with or without such materials as fibre, as long as such equivalents meet the requirements of a roll of the general character described.

The structure claimed below has been proved, by test for about a year, to be entirely satisfactory and of great practical value in the art.

Among the advantages of our invention we refer to the following:

The substantial increase of the amount of rubber extending radially outside of the metallic members for a given diameter of roll gives a substantially better wearing surface for the rubber, giving a much more effective cushioning effect, not only because there is more rubber extending radially outside of the metallic members but also because the rubber, so extending, may itself be made softer than the correspondingly extending rubber portions of prior devices. Moreover, having a larger flat surface than heretofore for adjacent soft portions of the rubber sections means a closer contact between adjacent sections with consequently much decreased chance for dirty liquors, for example, to leak down between the metallic members and attack them and then seep out and attack the goods treated by the roll. The increased area of the adjacent soft faces of the sections frictionally engaging each other, even though said faces are substantially flat, are very advantageous in preventing any gap between the sections, which gap might permit such leakage. Our substantially flat periphery of the flanges of the metallic members not only furnishes resistance to pressure of the rubber inward radially but also lacks any tendency to force apart adjacent rubber sections which tendency is present if the outer edge of the flange is sharp or bevelled, such separation tending to cause the leakage between the rubber sections referred to above. Our hook at the outer end of each flange gives a very substantial and practical grip for the base, or harder portion of the rubber sections.

What we claim is:

A sectional roll for the purposes described comprising a plurality of juxtaposed rubber sections, each having the inherent form of a solid of revolution, and having an outer portion, constituting substantially one-half of the radial depth of the section, which portion has a cylindrical periphery exposed at the active surface of the roll, and annular side portions disposed in radial planes and an inner portion of lesser axial width defining overhanging, inwardly facing surfaces at the inner side of the outer portion, a central shaft on which the sections are mounted, a series of metallic members carried by the shaft, each having a hub portion non-rotatably associated with the shaft and an annular flange disposed adjacent the inner portion of the rubber section, received beneath the overhanging surface thereof and having a substantially cylindrical surface underlying and supporting the said overhanging surface, said metallic members being pressed together axially along the shaft to press said flanges in compressing gripping relation against the inner portions of the rubber sections, providing a frictional grip resisting relative circumferential movement, the outer parts of said rubber sections being of relatively soft rubber and the inner parts being of relatively hard rubber, the parts merging substantially at the location of the outer peripheries of the flanges.

H. STANLEY CRYSLER.
ROBERT J. WILKIE.